United States Patent [19]

Orendi

[11] 3,730,635
[45] May 1, 1973

[54] DRILL PRESS

[76] Inventor: Roderich Orendi, Rosnetstrasse 50, Reutlingen-Sondelfingen, Germany

[22] Filed: Oct. 2, 1970

[21] Appl. No.: 77,661

[30] Foreign Application Priority Data

Oct. 6, 1969 Japan..............................44/79912

[52] U.S. Cl. ..........................408/46, 408/13, 408/12
[51] Int. Cl...........................B23b 39/18, B23b 41/00
[58] Field of Search........................408/9, 10, 12, 38, 408/43, 46, 53

[56] References Cited

UNITED STATES PATENTS

| 3,094,015 | 6/1963 | Mead | 408/38 X |
|---|---|---|---|
| 2,974,548 | 3/1961 | Miller | 408/46 |
| 3,253,484 | 5/1966 | Hill | 408/46 |

*Primary Examiner*—Francis S. Husar
*Attorney*—Wolfgang G. Fasse

[57] ABSTRACT

The drilling of holes in three different planes and thus into three different surfaces of a workpiece, especially extra heavy workpieces, is accomplished by the present numerically controlled drill press by means of mirror-symmetrical housings each carrying a rotational set of horizontal boring quills and long chuck jaws facing each other as well as an overhead vertical set of boring quills. The drill bits of the horizontal boring quills extend in their operational position through said long chuck jaws, whereby even I-beams may be drilled through three surfaces simultaneously.

6 Claims, 3 Drawing Figures

DRILL PRESS

The present invention relates to a drill press, more specifically a numerically, for example digitally, controlled drill press, wherein a tool change is accomplished selectively and automatically and drilling is possible in three different planes. This drill press is especially suitable for machining elongated heavy workpieces such as steel plates, box shaped items and especially construction sectional steel such as I-beams or the like, whereby the drilling takes place simultaneously at the end portions as well as at the connecting intermediate portion in accordance with predetermined boring diagrams. The drilled holes are thus located in several portions of the I-beam extending in the direction of the longitudinal axis of the beam but the directions of the drillings or thus the longitudinal axes of the drilled holes extend perpendicularly to said longitudinal axis of the beam.

Furthermore, the present drill press comprises boring units the drill bits of which are arranged substantially horizontally. The boring units are arranged in chuck jaws which are adjustable longitudinally and independently of each other and which are laterally effective for holding the workpiece. Longitudinal beams are supported on upright columns of which two each are arranged on both sides of the drill press. The longitudinal beams are provided with guide ways on which is guided a cross beam adjustable in the direction of said longitudinal beams. The cross beam carries boring units which are vertically effective and which are adjustable along the cross beam that is, perpendicularly to the longitudinal axis of the workpiece.

THE PRIOR ART

The prior art discloses drill presses of the above described gantry type of construction in which the chuck jaws are arranged independently of the lateral boring units. As a result, quite frequently the chuck jaws are in the way of the lateral horizontally effective boring units. Another drawback of prior art presses of this type is seen in that neither the chuck jaws nor the lateral nor the vertical boring units are adjustable in their position relative to the longitudinal axis of the workpiece, especially an elongated workpiece, such as a sectional steel beam. Generally in the prior art the boring units are all arranged in a single plane and are adjustable only in that single plane. Accordingly, in a sectional steel beam of the structural type it is possible to drill only those holes at a time which extend in one plane only. However, if it is necessary to drill the holes in accordance with boring diagrams comprising holes extending in several planes positioned one behind the other in the longitudinal direction of the sectional beam then it is necessary to release the sectional beam after the drilling of one set of holes from its chuck jaws to move the beam so that the holes in the next adjacent plane may be drilled and to adjust it properly whereupon the beam must be gripped again by the chuck jaws. This is not only a rather time consuming procedure but it is also rather difficult in view of the large dimensions of such sectional beams which have weights of several tons.

OBJECTS OF THE INVENTION

In view of the foregoing it is the main object of the invention to overcome the outlined drawbacks of prior art drill presses.

Another object is to assure a quick and especially safe as well as precise handling of very heavy workpieces such as constructional steel I-beams in a drill press.

A still further object is to assure a precise and simultaneous drilling in at least three different planes or directions.

Yet another object of the invention is to provide at least two boring units on each of two mirror-symmetrical housings for horizontal operation and at least two further boring units on a cross beam for vertical operation whereby all six boring units are adjustable independently of each other and in three dimensional directions.

Another object of the invention is to facilitate the precise positioning of even very heavy workpieces, such as structural I-beams, relative to the boring units.

A still further object of the invention is to employ boring units with tools magazines either of the serial or rotational type, whereby each of said magazines carries a plurality of drill bits of different diameter, and whereby the rotational tool magazines are arranged vertically aligned so that the drill bits may be brought into their operational position through a longitudinal slot extending vertically through longitudinal chuck jaws.

Yet another object of the invention is to press two mirror-symmetrical housings horizontally toward each other in support of the action of chuck jaws.

A still further object of the invention is to arrange a pair of longitudinal chuck jaws in such a manner that the exertion of a torque moment on the workpiece is avoided.

Yet another object of the invention is to facilitate the drilling of holes into heavy elongated workpieces so that said holes may extend in planes which in turn extend perpendicularly to the longitudinal axis of the workpiece.

SUMMARY OF THE INVENTION

The above objects have been attained according to the invention in a drill press, especially a numerically controlled drill press for simultaneously drilling a workpiece in three different planes which comprises frame means, at least three drilling units supported in such frame means, means operatively associated with said drilling units for adjusting the position of the drilling units in three dimensional directions, each of said drilling units is provided with a tool exchange magazine which carries several preferably six boring quills for six drill bits each having a different diameter. Any one of said six boring quills is arbitrarily or freely selectable. The machine according to the invention further comprises mirror-symmetrical elongated chuck jaws which are also arranged mirror-symmetrically to each other. The entire apparatus or press has a large heavy foundation structure which supports the individual members of the drill press and which is attached, for example by means of heavy bolts to sectional steel beams, for example I-beams embedded in a concrete foundation. The invention further comprises two mirror-symmetrical housings adjustably supported on said heavy foundation and carrying said chuck jaws as well as horizontally effective drilling units.

Preferably, each of the two mirror-symmetrical housings as well as a overhead vertical tool support carries two drilling units each which are provided with hydraulic counter balancing means; each of the drilling or boring units is numerically controllable whereby the horizontally operable drilling units comprise revolvable tool magazines each including, for example, six boring quills each quill carrying a drill bit of different diameter whereby it is possible to employ through the numerical control selectively any one of said drill bits for drilling different holes in the workpiece such as a sectional steel beam. Thus, it is possible to use simultaneously on each side of the workpiece two drill bits of different diameters.

In accordance with a further feature of the invention the selected boring quills of the revolving tool magazines arranged vertically one above the other are advanced or fed toward the working position through a long narrow vertically extending slot in the center of the chuck jaws and are thus brought to bear upon the workpiece. This arrangement has the advantage that the drill bits are arranged in the center of the chuck jaws whereby the force or pressure applied through the chuck jaws on the workpiece may be at its optimal strength and what is even more important, the chuck jaws cannot interfere with the advance of the drill bits.

In order that the invention may be clearly understood it will now be described, by way of example, with reference to the accompanying drawings, wherein.

Figure 1:
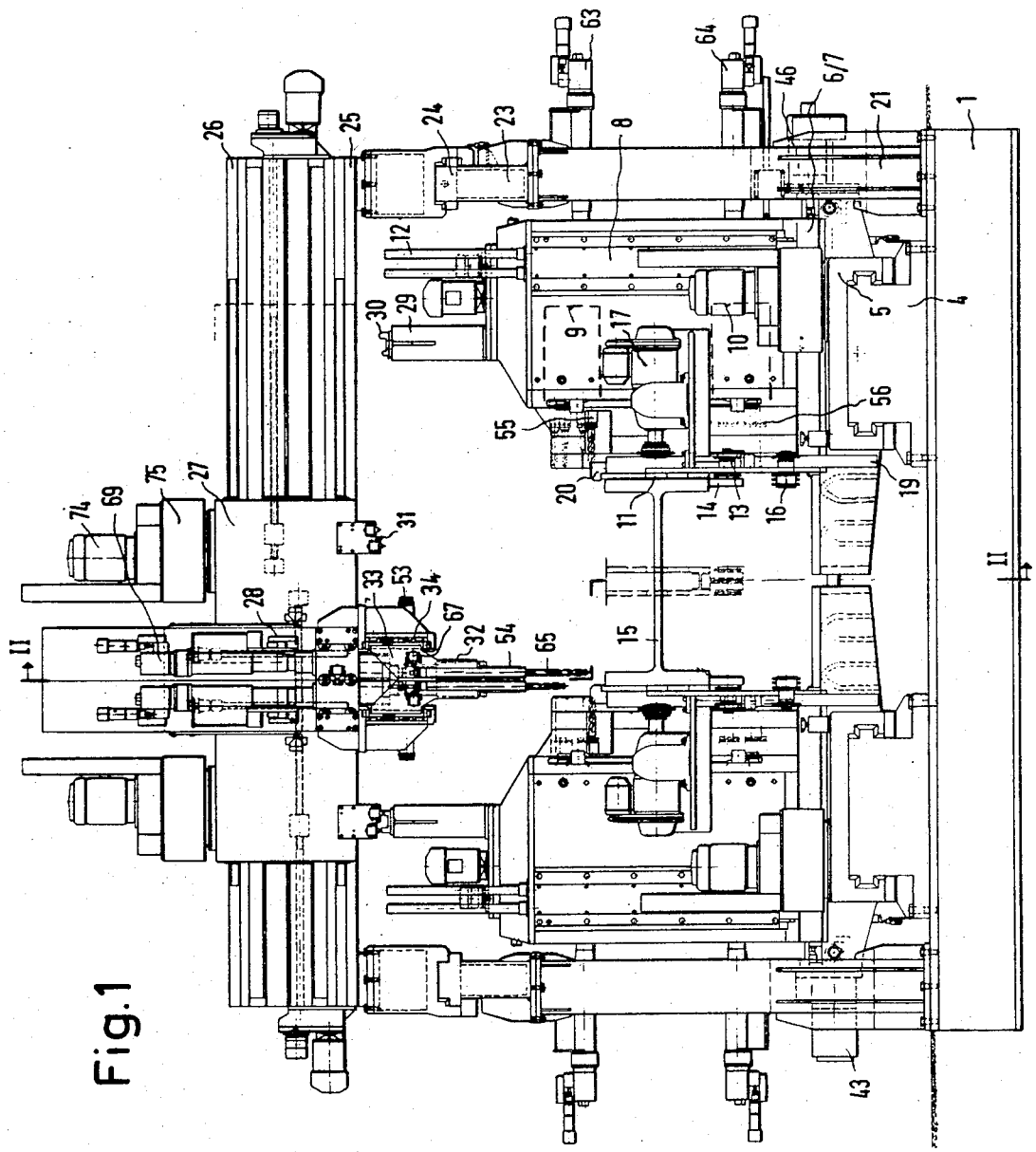
FIG. 1 illustrates a front view of the drill press according to the invention.

In the drawings most of the shown parts and units are present in mirror-symmetrical embodiments so that the figure description will refer to one mirror-symmetrical embodiment whereby it is understood that the other embodiment is of the identical mirror-symmetrical construction. Thus, in order not to overcrowd the drawings certain of the reference numerals have been omitted, as they would otherwise appear twice.

Figure 2:
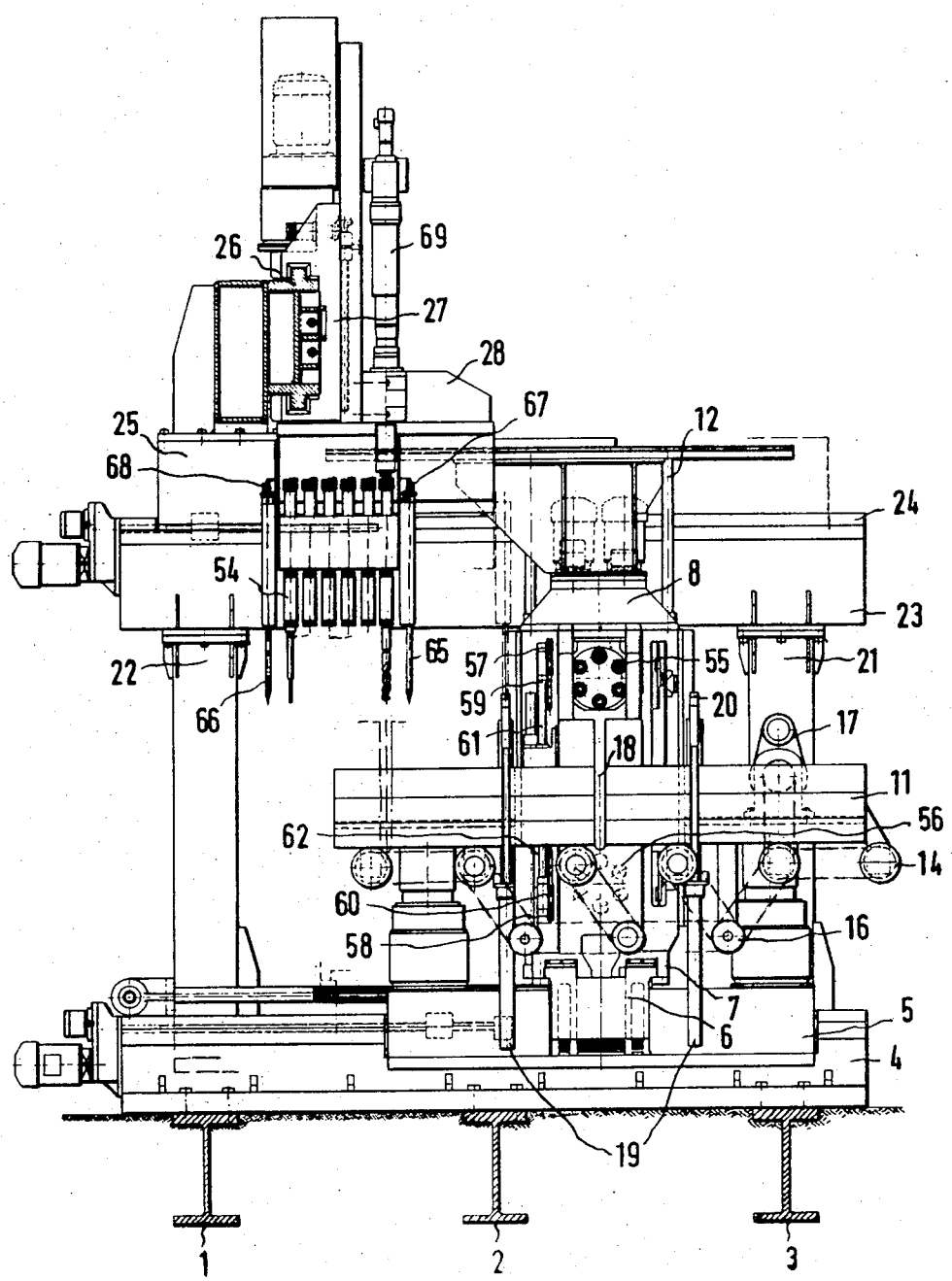
FIG. 2 is a sectional view in the direction of the sectional line II—II as shown by the arrows in FIG. 1.

Referring to FIGS. 1 and 2 there is shown a foundation structure comprising I-beams 1, 2, and 3 embedded in the concrete foundation. Footing members 4 are rigidly secured to the I-beams of the foundation, for example, by means of bolts and nuts. The footings 4 are provided with guide ways for cross sliding members 5. The cross sliding direction is the direction extending longitudinally along the footing member 4 as shown in FIG. 2 and said direction extends perpendicularly through the plane of the drawing of FIG. 1. The cross sliding members 5 are in turn provided with transverse guide ways 6 and 7 on which mirror-symmetrical housings 8 are mounted for transversal movement and adjustment. The housings 8 carry drilling units 9 and 10 of which the drilling unit 9 is arranged vertically above the drilling unit 10. The drilling units are adjustable in their vertical spacing from each other. Stated differently, these units 9 and 10 are vertically adjustable up and down. Thus, the vertical position of the two drills which are employed for the instant boring operation may be selectively and independently adjusted.

Each of the boring or drilling units 9 and 10 carries six boring quills 55, 56 arranged in revolving tool magazines. Furthermore, each housing carries a chuck jaw 11 thus, by the transversal positioning of the housings 8 the spacing between the chuck jaws 11 is adjustable. The transversal direction is defined as the longitudinal direction of the beams 1, 2, and 3.

Above the housing 8 there are shown two upright cylinders 12 which are part of the hydraulic counter balancing means for the drilling units 9 and 10.

Workpiece carrier rollers 14 are supported on horizontal axes 13. The horizontal axes 13 are supported on support members having a height above the ground level such that the carrier rollers are on a level corresponding to the level of feed-in and carry-out roller means. The carrier rollers 14 are driven by driving motors 17 through intermediate rollers 16, for example, over chain drive means. The active driving of the carrier rollers 14 for the workpiece has the advantage that the workpiece will always be pushed against a stop member. Thus, when the housings 8 and thus the chuck jaws 11 are moved laterally in the direction of the footing member 4 in order to bring the drill bits into another plane extending perpendicularly to the longitudinal axis of the workpiece 15, the carrier rollers 14 will be driven in the opposite direction so that the workpiece will not be taken along with the adjusting movement of the housings 8. For example, referring to FIG. 2 the carrier rollers will be rotated clockwise when the housings 8 are adjusted toward the left hand side of FIG. 2 whereby the workpiece will be held or pushed against the right hand stop member which is not shown in the present illustration as it is a part of the removal roller conveyor not shown.

In order to press the workpiece downwardly against the carrier rollers into an exact position in the work station there are provided down holding gripper means 20 which are positioned to the right and left of a longitudinal narrow slot extending through the chuck jaws 11 and arranged so that the drill bits extend through the slot when the drill bits are in their working position.

It will be noted that the slot has such a length that a drill bit of the upper drilling unit 9 or a drill bit of the lower drilling unit 10 may extend through the slot 18. The down holding means 20 are arranged in recesses to the right and left of said slot 18 and are driven by a hydraulic piston cylinder drive means 19. Such recesses extend vertically through the chuck jaws.

The housings in which said drilling units 9 and 10 are supported and to which said long chuck jaws 11 are mounted are supported on said cross carrier 5. The length of the chuck jaws 11 is about 2.5 meters whereas the longitudinal and lateral members of said cross carriers 5 are about 2 meters long, in order to assure a safe and precise guiding for the long and heavy sectional steel beams even under the rough wear and tear conditions posed by such heavy workpieces. The longitudinal guide means for the workpieces including the carrier rollers 14 and the down holding means 20 of the two mirror-symmetrical units are spaced from each other and parallel to each other along the longitudinal axis of the workpiece at such a spacing as to accommodate the largest size workpiece.

Two upright supporting columns 21 and 22 are also secured as by bolts and nuts to the I-beams 1 and 3. Two of such upright columns 21 and 22 are provided on each side of the press. Atop the columns there are secured two mirror-symmetrical longitudinal beams 23 provided with V-guide ways 24.

A cross beam 25 provided with glide rollers not shown but adapted for riding on said V-guides is arranged for sliding movement with its ends along the V-guide 24. The cross beam 25 is in turn provided with guide means 26 for the two transversal carriers or slides 27 to which are secured as by screws the vertical drilling units 28.

The transversal slides 27 are provided with limit switches 31 which cooperate with trip dogs 30 arranged atop of posts 29 positioned on the housings 8. Such limit switch and trip dop arrangements limit the outward or horizontal movement of the transversal slides 27. The transversal slides 27 are also provided with vertical guide ways in which the vertical boring or drilling units 28 are supported for their vertical positioning. This is best seen, in the top view of FIG. 3. Serial tool magazines 32 are supported at the lower end of the transversal slides 27. Each of the serial tool magazines carries six boring quills for six different drill bits. The magazines are supported in their carriers 33 in guides 34 for a sliding movement.

Figure 3:
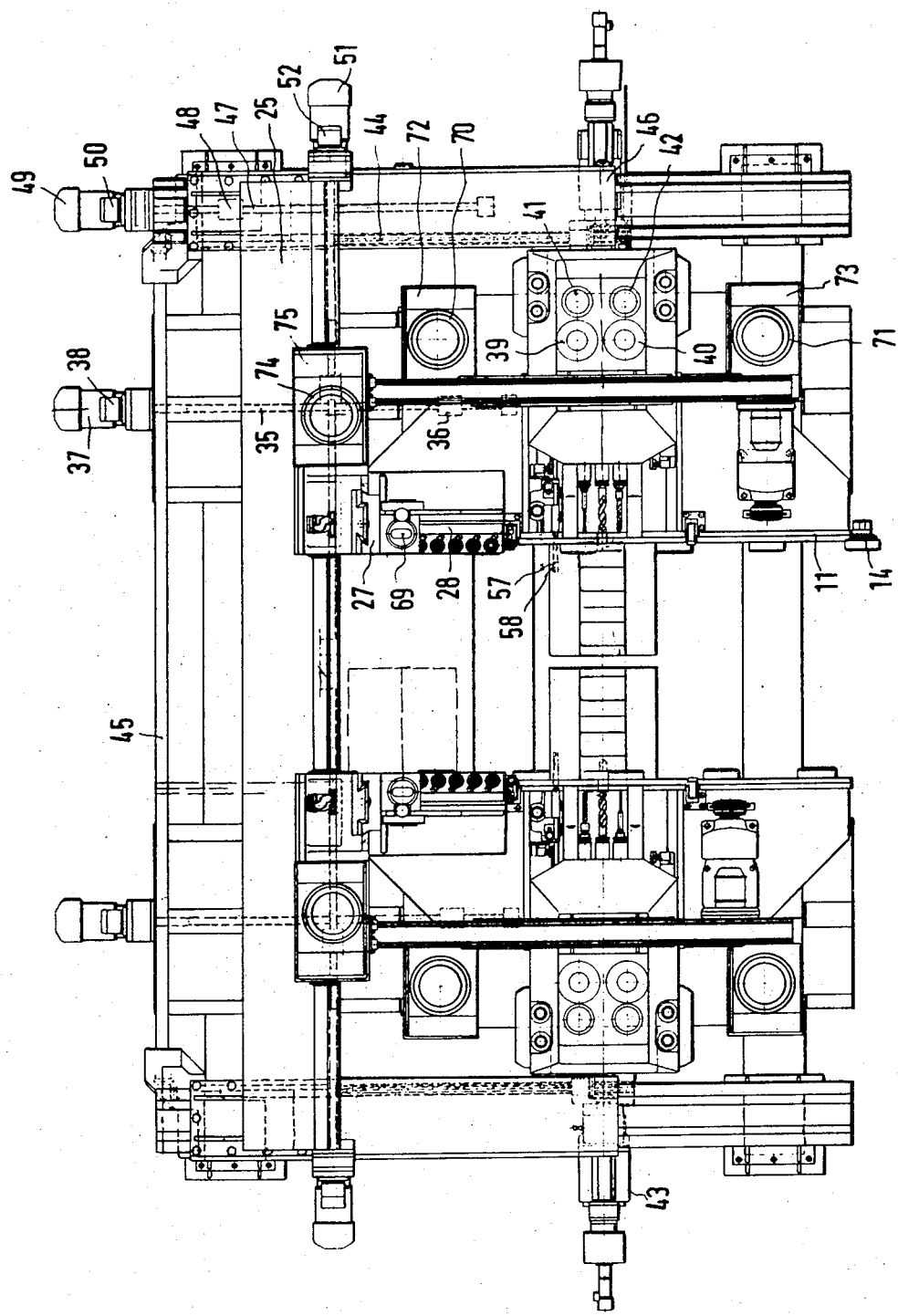
FIG. 3 is a top view onto the drill press according to the invention.

The housings 8 with their chuck jaws 11 are longitudinally movable and adjustable independently of each other by their numeric control means. This positioning of the housings 8 is accomplished by moving the cross sliding members 5 by means of spindle 35, the nut 36 as well as the direct current adjusting motors 37 which are controlled by the computer 38. This independent control makes it possible that the horizontal drilling units 9 or 10 of the two mirror-symmetrical sides of the drill press may be displaced with their drill bits relative to each other by as much as one meter, for example, so that they may be brought to bear upon the workpiece in such displacement positions. Referring in this connection to FIG. 3 the right hand housing 8 may thus be placed in the upper part of FIG. 3 whereas the left hand housing 8 may be placed in the center or even the lower part of FIG. 3. For this purpose the chuck jaws 11 are relatively long as mentioned above, for example, 2.5 meters long in order to avoid a torque moment which might otherwise be exerted on the workpiece. The advantage of this arrangement is that the workpiece will be precisely and exactly chucked regardless of the lateral displacement of the mirror-symmetrical housings 8 relative to each other. In this connection it should be noted that in spite of the independent longitudinal adjustment of the housings 8 it is possible according to the invention to provide for a dependent positioning of the housings 8 laterally across the drill press in order to assure a precise centering of the workpiece 15. The lateral adjustment or positioning of the housings 8 is accomplished by moving the housings along the lateral guide means 6 and 7 whereby one of the housings is driven directly and the other one is driven indirectly. For this purpose there are provided shaft connections extending all around the base of the entire drill press. Thus, on the left hand side of FIGS. 1 and 3 there is shown a direct current adjusting motor 43 for directly positioning the left hand housing 8 back and forth across the machine, that is in parallel to the beams 1, 2, and 3. The splined shafts 44 and the intermediate shafts 45 transmit the lateral positioning drive to the right hand housing 8. A hydraulic piston cylinder drive means 46 is provided for the right hand dependently driven housing 8 for pressing the housing 8 with its chuck jaw 11 toward the center of the drill press as will be explained shortly with reference to FIGS. 1 and 3.

Between the drive motor 43 and the directly driven spindle for the lateral positioning of the housings 8 there is arranged a gear drive transmission for reducing the r.m.p. a respective gear drive is also provided on the opposite side whereby the driving gear has a larger broad width in order to accommodate the lateral pressing of the indirectly driven housing as will now be explained. The directly driven upper portion of the cross slide is now advanced by means of the motor 43 into a position that the respective chuck jaw will be spaced from the center line of the press by a distance corresponding to one half of the total height of the I-beam 15. The upper portion of the cross carrier which supports the housing 8 is thereby rigidly supported by its respective spindle which has a self-locking pitch. The spindle of the opposite cross carrier member, in the example the right hand cross carrier member, bears against the piston rod of a hydraulic pressure cylinder and is now pressed toward the center of the machine, in the example toward the left, whereby the sectional I-beam is chucked. During this pressing toward the left the gear pinion or wheel on the spindle is coaxially displaced relative to the above mentioned gear wheel or pinion which has a relatively broad width whereby the meshing is assured during all operational positions. The just described positioning and adjustment steps thus serve for centering the workpiece, such as an I-beam, relative to the center of the press and simultaneously to chuck the workpiece in such centered position.

For the vertical adjustment of the horizontal drilling units 9 and 10 there are provided two direct current positioning motors 39 and 40 which are controlled by computers 41 and 42. These motors and computers are mounted at the top of the housings 8 as seen in FIG. 3.

The above mentioned cross beam 25 which supports the vertical boring units and which in turn is supported on longitudinal beams carrying guide ways for longitudinal slides carrying said cross beam 25, is driven by a spindle 47 through a nut 48 as well as a direct current position adjustment motor 49 which in turn is controlled by the computer 50, please see FIG. 3

Also shown in FIG. 3 is a position adjusting direct current motor 51 which is controlled by the computer 52 for laterally moving and positioning the cross slides 27 which carry the vertical drilling units 28.

In connection with the longitudinal positioning of the cross beam 25 that is in the direction of the longitudinal axis of the beams 23, it should be noted that only one of the cross beam supporting slides needs to be actively driven because these slides are rigidly interconnected by the cross beam 25.

The vertical boring units 28 which are supported by the cross slides 27 are adjustable independently of each other. The arrangement of the vertical boring units 28 on cross slide 27 has the advantage that even large differences in the level of different drilling planes may be accommodated. Thus, the boring quills need not be adjusted outside their normal range of feed advance.

The positioning and adjustment of these vertical slides of the cross carrier supported by the cross beam 25 is accomplished through spindles by numerical control means.

In order to selectively employ any one of the six different drill bits located in the serial tool magazines, the invention provides for the positioning and adjustment of the magazines 32 in the direction of the longitudinal axis of the workpiece. Thus, these magazines 32 are slidingly supported on said support members 33 in the guide ways 34 and their positioning is accomplished through hydraulic motors 53 shown in FIG. 1 which act through pinion and rack means not shown, the drill bits may be pre-selected through dialable limit switches not shown. Electro hydraulic indexing or stepping means are provided for moving these tool magazines 32 whereby the magazines are always returned to a starting position from which they are moved to the pre-selected position by said indexing means not shown but well known in the art.

The revolving tool magazines carrying the boring quills 55 and 56 of the horizontal drilling units 9 and 10 are advanced and positioned in the same manner as just described with reference to the vertical tool carrying magazines except that instead of the linear motion a rotational motion is involved.

The control of the positioning of the horizontal drilling units 9 and 10 through the motors 39 and 40 is accomplished by horizontal probe arms 57 and 58 shown in FIGS. 2 and 3. The probe arm 57 carries a vertically, downwardly extending probe pin 59 whereas the probe arm 58 carries an upwardly and vertically extending probe pin 60. As mentioned, these probe pins control the vertical positioning of the horizontal drilling units 9 and 10 whereby the just described probe arms with their probe pins are driven by hydraulic piston cylinder drive means 61 and 62. The probing pins 59 and 60 define a center or starting position for the vertical adjustment of the drilling units 9 and 10 when the pins touch or probe the horizontally extending center portion of the workpiece 15 whereafter the positioning of the horizontal boring units is performed. As soon as this positioning is completed the horizontal feeding and drive units 63 and 64 shown in FIG. 1 are switched on and their advancing quills are coupled with the quills 55 and 56 of the revolving magazines in order to rotate the latter boring quills 55, 56.

For the adjustment of the vertical drilling units 28 there are also provided probe pins 65 and 66 shown in FIGS. 1 and 2. These pins 65 and 66 extend downwardly slightly more than the drill bits of the vertical drilling units 27 whereby the probing pins 65 and 66 touch the horizontally extending center portion of the workpiece 15 prior to the contacting of the center portion by the drill bits. Accordingly, the probe pins activate the feed advance as well as the rotational drive unit 69 by means of limit switches 67 and 68 arranged at the upper ends of the probing pins 65 and 66 as shown in FIGS. 1 and 2. The feed advance and rotational drive units 63 and 64 as well as 69 are all identical to each other.

The hydraulic piston cylinder drive means and motors for the horizontal drilling units 9 and 10 receive their hydraulic oil from the pumps 70 and 71 which in turn obtain the oil from containers 72 and 73.

The hydraulic piston cylinder arrangements and oil motor drives for the vertical drilling units 28 receive their hydraulic oil from the pumps 74 connected to oil containers 75 as shown in FIGS. 1 and 3.

It is an advantage of the invention that all positioning spindles, that is the drive spindles for the longitudinal slide carriers 5 of the housings 8 with their chuck jaws 11 and the horizontal boring or drilling units 9 and 10 as well as the drive spindles for the vertical adjustment of the horizontal boring units and the drive means for the cross beam 25 as well as the transversal slides for the vertical drilling units 28, may be driven by computing positional drive means. All of the drive spindles have the same pitch. This has the further advantage that the numerical control for the precise positioning of all tool workpiece contact positions has been simplified because an electrical transformation in connection with the numerical control has been obviated.

In connection with the above mentioned fact that all feed advance and rotational drive means for the horizontal as well as for the vertical boring quills are identical to each other it should be noted that these drive means are provided with an electro hydraulic remote control adjustment whereby selectively one of four different feed advance and return speeds may be employed.

It is also an advantage of this invention that all slide guides are of the prism or V-shape type cooperating with guide rollers so that all play is substantially eliminated.

Although the invention has been described with reference to a specific embodiment, it is to be understood that it is intended to cover all modifications and equivalents within the scope of the appended claims.

What I claim is:

1. In a drill press for sectional steel wherein first and second horizontally effective drilling means and third vertically effective drilling means are provided for drilling a plurality of holes into a sectional steel member having a longitudinal axis, the improvement comprising a supporting base structure, first and second housings for said respective first and second horizontally effective drilling means, first guide ways for said first housing, second guide ways for said second housing, said first and second guide ways being arranged on said base structure in parallel to said longitudinal axis and substantially mirror symmetrically to a plane extending vertically through said longitudinal axis, first and second drive means for moving said respective first and second housings independently of each other back and forth along the respective first and second guide way, a cross beam, third guide way means also supported on said base structure, means for movably supporting said cross beam on said third guide way means so that said cross beam extends substantially across said longitudinal axis above said first and second housing, third drive means for moving the cross beam back and forth along said third guide way means in the direction of said longitudinal axis and independently of the movement of said first and second housings, a third housing for supporting said third vertically effective drilling means on said cross beam, and elongated chuck jaws carried by said first and second housings, whereby said holes may be drilled simultaneously in three different planes extending vertically and in parallel to each other.

2. The drill press according to claim 1, further comprising first slide means arranged between said first housing and said first guide ways, second slide means arranged between said second housing and said second guide ways, power drive means operatively connected to said first and second housing for moving the latter toward and away from each other substantially perpendicularly to said longitudinal axis, third slide means for movably connecting said third housing of the vertically effective drilling means to said cross beam and further power means for moving said third housing vertically up and down.

3. The drill press according to claim 1, wherein each of said elongated chuck jaws has such a length that a torque moment is prevented even if the housings are displaced along said longitudinal axis relative to an aligned position of the housings.

4. The drill press according to claim 1, further comprising means for supporting said workpiece, said supporting means being attached to said first and second housings underneath said elongated chuck jaws, and workpiece down holding means arranged above said supporting means and above said chuck jaws.

5. The drill press according to claim 4, wherein said workpiece supporting means comprise roller means, active drive means operatively connected to said roller means, and wherein said workpiece down holding means comprise drive means for moving the down holding means vertically toward and away from said roller means.

6. The drill press according to claim 1, wherein each of said first and second drilling means carried by said first and second housings in horizontal drilling positions comprise an upper and a lower drilling unit carrying respective drilling bits and arranged in vertical alignment relative to each other and wherein said elongated chucks have a vertically extending longitudinal slot therein through which slot said drilling bits of the upper and lower drilling units advance.

* * * * *